(12) United States Patent
Weidauer (10) Patent No.: US 11,303,131 B2
(45) Date of Patent: Apr. 12, 2022

(54) AUTONOMOUS OPERATION OF AN ENERGY SUPPLY DEVICE

(71) Applicant: SIEMENS AKTIENGESELLSCHAFT, Munich (DE)

(72) Inventor: Jens Weidauer, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 16/639,222

(22) PCT Filed: Aug. 24, 2017

(86) PCT No.: PCT/EP2017/071317
§ 371 (c)(1),
(2) Date: Feb. 14, 2020

(87) PCT Pub. No.: WO2019/037853
PCT Pub. Date: Feb. 28, 2019

(65) Prior Publication Data
US 2020/0259335 A1 Aug. 13, 2020

(51) Int. Cl.
*H02J 3/38* (2006.01)
*H02J 3/46* (2006.01)

(52) U.S. Cl.
CPC ............... *H02J 3/381* (2013.01); *H02J 3/46* (2013.01); *H02J 2300/10* (2020.01); *H02J 2300/20* (2020.01)

(58) Field of Classification Search
CPC .......... H02J 3/381; H02J 3/46; H02J 2300/10; H02J 2300/20; H02J 13/00002;
(Continued)

(56) References Cited

U.S. PATENT DOCUMENTS 7,711,460 B2 * 5/2010 Yakes ...................... B60L 1/00
701/22
8,373,291 B2 2/2013 Zeumer et al.
(Continued)

FOREIGN PATENT DOCUMENTS

EP 2947743 A2 11/2015
WO WO2009036895 A2 3/2009
WO WO-2009036895 A3 * 11/2009 .............. H02J 3/381

*Primary Examiner* — Ziaul Karim
(74) *Attorney, Agent, or Firm* — Laurence A. Greenberg; Werner H. Stemer; Ralph E. Locher (57) ABSTRACT

An energy supply device contains: (a) a supply mechanism for supplying electrical power for a power supply system or for an electrical consumer connected to the power supply system; (b) a control unit for controlling an operation of the supply mechanism in first and second operating modes; (c) an interface configured to receive external control signals and to forward the external control signals that indicate how the supply mechanism works in the first operating mode; and (d) a communication monitoring unit that is coupled to the interface and the control unit and monitors whether external control signals are received by the interface, and, if the interface has not received any external control signals or any valid external control signals over a pre-determined amount of time, to transmit an operating mode control signal to the control unit, which causes it to operate the supply mechanism in the second operating mode.

13 Claims, 1 Drawing Sheet

(58) Field of Classification Search
CPC ......... Y02E 60/00; Y02E 40/70; Y04S 10/30; Y04S 10/123
See application file for complete search history.

(56) References Cited

U.S. PATENT DOCUMENTS

| | | | |
|---|---|---|---|
| 9,853,582 B2 | 12/2017 | Son | |
| 2010/0312409 A1* | 12/2010 | Zeumer | H02J 3/46 700/287 |
| 2012/0271475 A1* | 10/2012 | Wang | H02J 13/00002 700/295 |
| 2014/0070617 A1* | 3/2014 | Detmers | H02J 3/00 307/64 |
| 2014/0074311 A1* | 3/2014 | Kearns | H02J 3/24 700/297 |
| 2017/0025894 A1* | 1/2017 | Sanders | G05B 15/02 |

* cited by examiner

AUTONOMOUS OPERATION OF AN ENERGY SUPPLY DEVICE

BACKGROUND OF THE INVENTION

Field of the Invention

The present invention generally relates to the technical field of electrical energy supply in a power grid, for example, a so-called stand-alone power grid. In particular, the present invention relates to an energy supply device for supplying electric power or energy for an electrical network or for the electrical loads connected to the power grid, and an energy supply system comprising a plurality of such energy supply devices. Furthermore, the present invention relates to a method for supplying electric power or energy, and to a computer program for carrying out or controlling such a method.

Hybrid energy supply systems typically combine several different energy supply devices in order to supply an electrical power grid with electrical energy or power in a preferably reliable manner and preferably utilizing regenerative energy, or to form an electric stand-alone power grid, and to supply the connected electrical loads with electric power or energy reliably and in an efficient manner. Typical energy supply devices, which can form a variety of configurations of energy supply systems in different combinations, include (a) (diesel) generators, (b) combined heat and power plants, (c) photovoltaic plants, (d) wind turbines, and (e) electrical energy stores comprising batteries, wherein, however, this list is not conclusive. The energy supply devices (a) to (d) are energy generation devices which convert non-electrical primary energy into electrical energy. The energy supply device (e) must initially be supplied or charged with generated electrical energy before it can deliver the stored electrical energy at a later point in time at which, for example, little regenerative energy is available and/or the connected electrical loads have a higher energy requirement.

An energy supply system often has a superordinate control unit. Said control unit in particular ensures that, depending on (i) the operating states of the connected loads or their instantaneous and/or forecast energy requirement for the near future, and/or (ii) the operating states of the energy supply devices or the electric power which they are able to supply instantaneously and/or are (forecast) to be able to supply in the near future, the various energy supply devices are controlled. Such a control comprises in particular a (controlled or regulated) setting of the electric power which is exchanged by the relevant energy supply device with the power grid. In this case, the quantity of electric power may be set continuously or in small steps, or the relevant energy supply device may be completely connected or disconnected. A superordinate control unit is often referred to as a (superimposed) control system. Generally, ensuring high stability of the relevant power grid and energy generation at an optimal cost are used as criteria for control of the power supply from the various energy supply devices.

However, it is possible that a communication link fails, via which control signals are transmitted for controlling at least one energy supply device. This results in uncontrolled operation of the relevant energy supply device, thus impairing the stability of the relevant power grid and thus jeopardizing the supply reliability of the power supply for the connected loads. In order to minimize the effects of disrupted or failed communication links, in known energy supply systems, the communication links are laid redundantly. This means that for each communication link, at least two independent communication channels are provided. However, implementing this approach entails considerable additional costs.

SUMMARY OF THE INVENTION

The object of the present invention is to improve the supply reliability for electrical loads which are connected to a power grid which is supplied by an energy supply system described above, in a simple and effective manner.

This object is achieved by means of the subject matter of the independent patent claims. Advantageous embodiments, further features, and details of the present invention result from the dependent claims, the description, and the drawing. In this case, features and details which are described in conjunction with the device-related claims, apply of course to the method-related claims and to the computer program, and vice-versa, so that reference may always be made reciprocally to the individual aspects of the present invention, with respect to the disclosure of this invention.

According to a first aspect of the present invention, an energy supply device is described, which comprises (a) a supply means for supplying electric power for a power grid or for the electrical loads connected to the power grid; (b) a control unit for controlling the operation of the supply means in a first operating mode and in a second operating mode; (c) an interface, configured for receiving external control signals and for routing the external control signals which are indicative of the manner in which the supply means works in the first operating mode; (d) a communication monitoring unit which is coupled to the interface and the control unit and which is configured to monitor (d1) whether external control signals are received by the interface and, (d2) if no external control signal or no valid external control signal was received by the interface for a predetermined period of time, to transmit an operating mode control signal to the control unit which induces the control unit to operate the supply means in the second operating mode.

The described supply device is based on the finding that within an energy supply system having preferably several such energy supply devices, the effects of a failure of a communication link via which the external control signals are normally transmitted, are compensated for at least in such a way that the supply means transitions to the second operating mode. The second operating mode may in particular differ from the first operating mode in that an absence of the external control signals does not result in an undesirable or even hazardous instability of the overall energy supply device. Rather, in the second operating mode, the supply device or the supply means works autonomously. Even if such autonomous operation should not typically be so advantageous in particular with respect to the efficiency of the energy supply system, the provision of the second operating mode and in particular the automatic transition to this second operating mode is very much more efficient in comparison to the effort required for redundantly laying communication links. In the case of such a consideration, it is also to be considered that, in the normal case and thus for the majority of time, the relevant energy supply device works in the first operating mode or at least not in the second operating mode.

The described units of the energy supply device, in particular the control unit and the communication monitoring unit, constitute functional units which may be implemented as a function of the specific embodiment by means of hardware, software, or in hybrid form by means of a combination of hardware and software. These units may also be implemented by means of a common unit by means of hardware and/or by means of software, with which the interface may in addition be optionally associated.

The external control signals may be transmitted from any arbitrary entity to the described interface. This entity may be a so-called control system of an energy supply system, which, in addition to the described energy supply device, also controls at least one other energy supply device.

The various operating modes may in particular differ from each other by means of the values of electrical parameters or of corresponding internal control parameters. This in particular includes parameters which are indicative of the power which is fed in by the relevant energy supply device into the power grid. If the energy supply device is an electrical energy store, such a (further) parameter may in particular be indicative of the power which is, or is to be, fed into the power grid instantaneously or in the near future.

In this document, the term "external control signal" does not only mean signals which result in a change in the manner of operation of the supply means (in the first operating mode). A control signal may also be a signal which ensures that the control means maintains the operation of the supply means (in the first operating mode). In this case, the control signal receives the information to maintain the operation of the respective supply means unchanged (at least for a certain period of time).

In this document, a "control signal" is to be completely generally understood as any information transmitted or to be transmitted, which has an influence on the manner of operation of the supply means (in the first operating mode) or on a transition between the two operating modes. The information may be transmitted in analog or digital form by means of suitable voltage profiles. The information may be transmitted on the basis of a suitable communication protocol by means of messages, data telegrams, etc.

The predetermined period of time may be measured or monitored in manifold ways. Means which are currently considered to be suitable means include, for example, timers, continuous counters, so-called watchdogs, etc.

It is to be noted that in this document, sometimes, the term "energy", and in another place, the term "power", is often used for one and the same technical process, in conjunction with the same technical process. The physical variable "energy" is the power integrated over a certain period of time in a known manner.

According to one exemplary embodiment of the present invention, the energy supply device (a) is a power generator, in particular a diesel generator, (b) a combined heat and power plant, in particular a micro-CHP plant, comprising a current generation turbine, (c) a photovoltaic system, (d) a wind turbine system, or (e) an electrical energy store.

The present invention can be implemented by means of various types of energy supply devices and thus has an extensive application potential. Basically, all types of devices (i) for generating electrical energy, (ii) for converting thermal or mechanical energy into electrical energy, and (iii) for temporarily storing electrical energy, may be used. In particular, several different types of energy supply devices which supply the connected loads with electrical energy may be connected to the described power grid for an (ecologically) balanced energy mix.

According to another exemplary embodiment of the present invention, the second operating mode is an autonomous operating mode. This may in particular mean that the control unit controls the operation of the energy supply device based only on internal current operating parameters and/or on input values which are detected by the energy supply device itself or by sensors which are associated with the energy supply device. In particular, "autonomous" means that the control of the energy supply device is not dependent on external control signals.

An autonomous operating mode may also exist if a communication link from and to external entities, for example, a control system of an energy supply system, is intact, but for some reason, (valid) external control signals are still not received or are not used. Such a "non-use" of control signals may, for example, be meaningful if the energy supply device is operated only for test purposes in the second autonomous operating mode.

According to another exemplary embodiment of the present invention, the energy supply device furthermore comprises a power grid monitoring unit which is coupled to the control unit and which can be coupled to the power grid at a measurement point.

In the simplest case, the power grid monitoring unit may be a (local) measurement device for detecting the frequency and/or the voltage of the power grid at the aforementioned measurement point. The instantaneous grid frequency and/or the instantaneous grid voltage can in fact give the control unit important information about the instantaneous degree (of utilization) of the power grid, which is used in the second (autonomous) operating mode by the control unit for controlling a suitable control of the operation of the energy supply device with respect to high power grid stability. With respect to proactive stabilization of the power grid, temporal changes in the aforementioned power grid parameters frequency and/or voltage may also be used.

It should be noted that other physical parameters may also be used which are characteristic of the instantaneous state of the power grid. For example, the phase angle between the voltage and a current flowing out of the power grid or flowing into the power grid may be detected, the phase angle of which being indicative of the magnitude of reactive power. Some energy supply devices, in particular those which are connected to the power grid via a so-called AC-DC-AC power converter, may also contribute to reactive power compensation by means of suitable operation of high-power semiconductor switches of the converter.

According to another exemplary embodiment of the present invention, only a primary regulation and/or a tertiary regulation takes place in the second operating mode. A secondary regulation does not take place in this exemplary embodiment in the second operating mode.

The primary regulation may be implemented by means of a "droop function" which is integrated into the control unit.

The tertiary regulation may be implemented by means of a connection or disconnection control which is integrated into the control unit.

The expression "primary regulation" may in particular be understood to mean a regulation which, in the case of a difference arising between an actual value and a setpoint value of a power grid, performs a control action of which the magnitude is directly dependent on the difference. In the case of a proportional regulator, a corresponding regulation characteristic is a straight line or a "droop function". A primary regulation having in particular a "droop function" can ensure that the power contributions between various energy supply devices are distributed according to their respective power capacity. This can occur virtually instantaneously, i.e., without a time delay.

The expression "secondary regulation" may in particular be understood to mean a regulation which ensures that the frequency and voltage are aligned with their setpoint values, based on a temporary change in at least one setpoint value of a power grid parameter. The secondary regulation is typically somewhat slower than the primary regulation. A secondary regulation typically extends across multiple energy supply devices and may therefore be referred to as a collective regulation. For this reason, in the aforementioned autonomous operating mode, the execution of a secondary regulation is ruled out.

The expression "tertiary regulation" may in particular be understood to mean a regulation which is slower with respect to the primary and the secondary regulation, which ensures that enough energy supply capacity is available for a balance between supplied power and drawn power, by means of connecting or disconnecting energy-supplying energy supply devices or energy-drawing energy supply devices. For reasons of efficiency, if more than sufficient energy supply capacity is available, individual energy supply devices may be (temporarily) disconnected by means of the tertiary regulation. In this case, energy-supplying energy supply devices may include the aforementioned energy supply devices (a) to (d) and the electrical energy store (e), if it is currently being discharged. An energy-drawing energy supply device may be the electrical energy store (e), if it is currently being charged (by means of excess power available in the grid).

According to another aspect of the present invention, an energy supply system is described which comprises (a) at least two energy supply devices as described above, and (b) a superordinate control device which is coupled communicatively to the energy supply devices via a communication link, so that, if the communication link is intact, the external control signals from the superordinate control device are transmittable to the respective control unit of the energy supply devices.

The described energy supply system is based on the finding that even in the case of a failure of the communication link, further operation of the energy supply devices can be ensured, wherein the further operation in particular with respect to the stability of the power grid is not significantly less favorable than operation, among other things, controlled by the superordinate control device. It may thus be required that certain limitations with respect to optimal operation must be accepted. In the case of a suitable setting of the control parameters for the second operating mode, however, these limitations are typically not serious enough that they would justify the construction of a second redundant communication link.

The described superordinate control device, which may also be referred to as a (superordinate) control system, preferably implements a tertiary and a secondary regulation. A primary regulation (which is customized for each energy supply device) is typically not carried out.

With the described energy supply system, a so-called stand-alone power grid may advantageously be formed. A stand-alone power grid is a power grid in a known manner, to which only a few energy supply devices are connected, which supplies a spatially restricted area and which has no electrical connection to other power grids.

According to another aspect of the present invention, a method is described for supplying electric power for a power grid or for the electrical loads connected to the power grid by means of an energy supply device. The energy supply device may in particular be an energy supply device of the above-described type. The method comprises (a) monitoring whether external control signals are received by an interface of the energy supply device; and if, for a predetermined period of time, no external control signal or no valid external control signal has been received by the interface and routed to a control unit of the energy supply device, (b) transitioning the energy supply device from a first operating mode to a second operating mode.

The described method is also based on the finding that in the case of a failure of a communication link via which, in normal operation, the external control signals are received from a superordinate control device of the energy supply system, further operation of the energy supply device affected by the failure of the communication link is possible, wherein the stability of the power grid is not jeopardized or is not significantly jeopardized. This is ensured by the described second operating mode, which enables autonomous operation of the energy supply device by means of suitable operating parameters (values). The operating parameters (values) are preferably predetermined by an (internal) control unit of the energy supply device, wherein they may also be dependent on locally obtained measured values, in particular on measured values which are indicative of the instantaneous state of the power grid.

According to another exemplary embodiment of the present invention, a control unit of the energy supply device controls a supply means of the energy supply device in the second operating mode in such a way that the supply means supplies electric power to the power grid which has a predetermined ratio in relation to another electric power which is supplied to the power grid by another supply means of another energy supply device.

Expressed concretely, the (local) control unit, possibly together with at least one other (local) control unit of the other energy supply device, ensures that (also) in the second operating mode, a predetermined ratio between the electrical energy power contributions of the individual energy supply devices is provided. This ratio can in particular result from the power capacity, in particular the maximum power of the respective energy supply device. Similar energy supply devices having an identical electrical power capacity thus respectively preferably provide the same electric power.

It should be noted that if the energy supply devices are electrical energy stores, the corresponding local control unit(s) may ensure that a predetermined ratio with respect to the electric power respectively drawn by the power grid is produced.

According to another exemplary embodiment of the present invention, if, after a certain period of time, valid external control signals are again received, the method furthermore comprises transitioning the energy supply device from the second operating mode to the first operating mode. As a result, after re-establishing the communication link, it is advantageously possible to transition automatically again to the first operating mode, which is typically at least somewhat better for the stability of the power grid and in particular for the energy efficiency of the power generation.

According to another exemplary embodiment of the present invention, the transition from the second operating mode to the first operating mode takes place only after a predetermined delay time after the renewed reception of valid external control signals. As a result, it may in particular be prevented that in the case of the communication link functioning again, several energy supply devices go onto the grid simultaneously and thereby impair the stability of the grid. For this purpose, within an energy supply system having several energy supply devices, it is possible to associate different delay times with different energy supply devices.

According to another exemplary embodiment of the present invention, the method furthermore comprises, before the transition of the energy supply device from the second operating mode to the first operating mode, a parameterization of the energy supply device with parameter values which, in the case of a transition from the second operating mode to the first operating mode, are indicative of the manner of operation in the first operating mode.

As a result, by means of a suitable choice of the parameter values, in the case of switching from the second operating mode to the first operating mode, said switchover naturally being a discrete process, it may be prevented that this switchover results in instability of the power grid. In this case, it is generally sufficient if the parameterization is valid only for a comparatively short period of time beginning with the period of time of the switchover. Thereafter, the above-described superordinate control unit can assume the global control of the relevant energy supply device and transmit new parameter values therefor to the (local) control unit.

By means of a suitable parameterization, in particular the frequency and the level of the voltage supplied at the beginning of the first operating mode by the energy supply device may be set. In any case, by means of the described parameterization, a smooth transition between the two operating modes can be ensured, so that it is not necessary to be concerned about instabilities in the power grid.

The instantaneous state of the power grid may also be considered also in relation to suitable parameter values. As already mentioned above, in particular the instantaneous frequency and/or the instantaneous voltage at a measurement point of the power grid may be used for this.

According to another exemplary embodiment of the present invention, if valid external control signals are received for a further predetermined period of time, the method further comprises (a) receiving a diagnosis start signal by means of the control unit; (b) transitioning the energy supply device from the first operating mode to the second operating mode; (c) collecting diagnosis information which is indicative of operating parameter values of the energy supply device in the second operating mode; and (d) transmitting the diagnosis information to a superordinate control device. The superordinate control device may in particular be the aforementioned superordinate control unit in conjunction with the energy supply system, which at least helps determine not only the operation of the aforementioned energy supply device, but also the operation of at least a further energy supply device.

Expressed concretely, in the case of the method described here, despite a functioning communication link, the energy supply device is (ostensibly unnecessarily) transitioned to the second operating mode. While the energy supply device works in this second operating mode, however, by means of suitable measuring devices and/or by means of an analysis of operating software, diagnosis information is collected which characterizes the manner of operation of the energy supply device in the second operating mode. This diagnosis information may then be analyzed by the superordinate control device or any other evaluation unit, so that via the behavior of the energy supply device in the second operating mode, it is possible to obtain knowledge which, for example, can be used for a preferably suitable parameterization. As a result, it is also possible to implement (discrete) transitions between the various operating modes more smoothly, so that a further contribution to stabilization of the power grid is achieved.

According to another aspect of the present invention, a computer program is described for supplying electric power for a power grid or for the electrical loads connected to the power grid, by means of an energy supply device, in particular an energy supply device of the type described above. When it is executed by a processor, the computer program is configured for carrying out the method described above.

The computer program may be implemented as computer-readable instruction code in any suitable programming language, for example, in JAVA, C++, etc. The computer program may be stored on a computer-readable storage medium (CD-ROM, DVD, Blue-ray disk, removable disk drive, volatile or non-volatile memory, installed memory/processor, etc.). The instruction code can program a computer or other programmable devices, in particular, a control unit for an energy supply device, in such a way that the desired functions are carried out. Furthermore, the computer program may be provided in a network, for example, the Internet, from which it may be downloaded as needed by a user.

The present invention may be implemented both by means of a computer program, i.e., software, and by means of one or several special electronic circuits, i.e., in hardware or in any hybrid form, i.e., by means of software components and hardware components.

The present invention described in this document may also be carried out using a "cloud" network having corresponding virtual memory space and corresponding virtual computing capacity.

Additional advantages and features of the present invention result from the following exemplary description of currently preferred embodiments.

DETAILED DESCRIPTION OF THE INVENTION

In the drawing, identical components are provided with the same reference characters.

It should be noted that the embodiments described below depict only a limited selection of possible design variants of the present invention. In particular, it is possible to combine the features of individual embodiments in a suitable manner, so that for those skilled in the art having the embodiment variants explicitly depicted here, a plurality of different embodiments is to be considered to be publicly disclosed.

Figure 1:
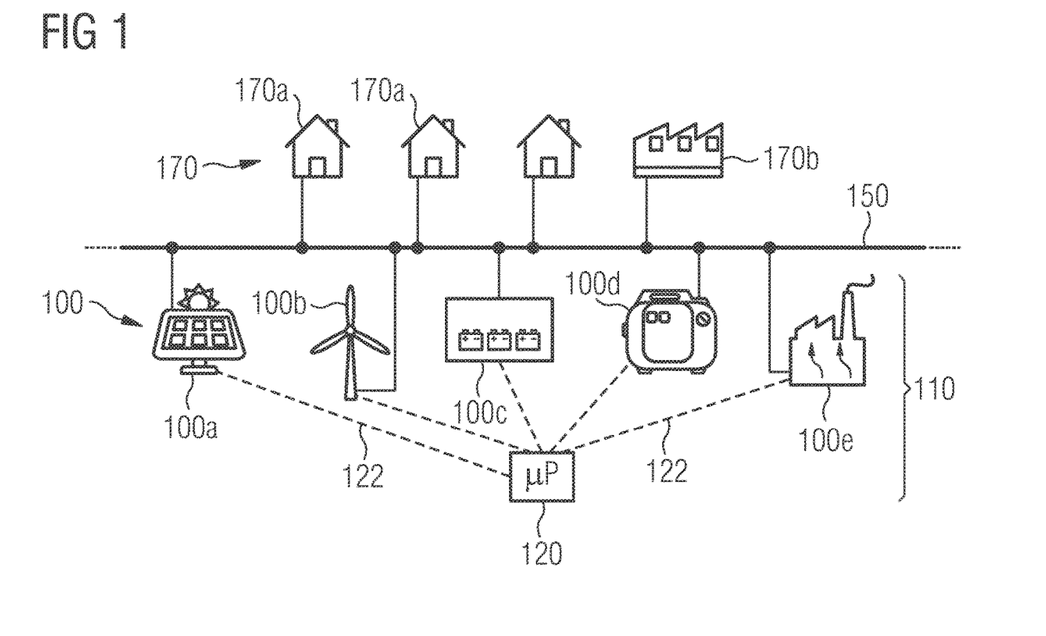
FIG. 1 depicts a power grid comprising several connected electrical loads and an energy supply system comprising a "mix" of different energy supply devices.

FIG. 1 depicts a power grid 150 to which several electrical loads 170 are connected. According to the exemplary embodiment depicted here, the electrical loads 170 comprise several households 170a and a factory 170b which has a particularly high demand for electrical energy in comparison to the households 170a. The electrical energy needed by the electrical loads 170 is applied by an energy supply system 110 which comprises a plurality of different types of electrical energy supply devices 100. The energy supply system 110 is essentially a so-called "decentralized system". This is most simply illustrated in that each of the energy supply devices 100 is connected to a different connection point on the electric power grid 150. Of course, it is also possible to electrically combine individual energy supply devices 100 and to connect them to the electrical power grid 150 at a common connection point. Any other "mix" of energy supply devices 100 is also possible.

According to the exemplary embodiment depicted here, the electrical energy supply system 110 comprises two types of so-called "regenerative" energy sources, i.e., a photovoltaic system 100a and a wind turbine 100b. In addition, the energy supply system 110 comprises two conventional energy generators, i.e., a power generator 100d (operated with diesel fuel) and a combined heat and power plant 100e, which in particular may be a so-called micro-CHP plant. Furthermore, the energy supply system 110 also comprises an electrical energy store 100c, which draws electrical energy from the power grid 150 and stores it during periods of "power oversupply", and delivers at least a portion of the stored electrical energy back to the electric power grid power grid 150 during periods of "power shortage". In this way, it is possible to balance temporary fluctuations in the relationship between (i) the electric power needed by the electrical loads 170 and (ii) the electric power supplied or generated by the energy supply devices 100a, 100b, 100d, and 100e.

In order to coordinate the operation of the electrical energy supply system 110 and thus to ensure high energy efficiency, a superordinate control device 120 is provided which is frequently referred to as a control system, which transmits suitable coordinated control signals to the individual energy supply devices 100 or their local control units via a plurality of communication links 122. In the exemplary embodiment depicted here, each of the energy supply devices 100 is connected via a separate communication link 122 to the superordinate control device 120. Instead of such a star-shaped connection, other topologies of communication networks may also be used.

It is apparent that in the case of a failure of at least one communication link 122, the energy supply device 100 affected by the failure can no longer be operated in a coordinated manner (with respect to other energy supply devices 100). As a result, in particular the efficiency of the electrical energy supply is reduced.

In order to minimize the negative effects of a failure of a communication link 122, according to the exemplary embodiment depicted here, at least some of the energy supply devices 100 comprise a (local) control unit which is capable of detecting a failure of the respective communication link 123 and then ensuring that the relevant energy supply device 100 transitions from a first operating mode (normal operation) to a second operating mode (emergency operation).

Figure 2:
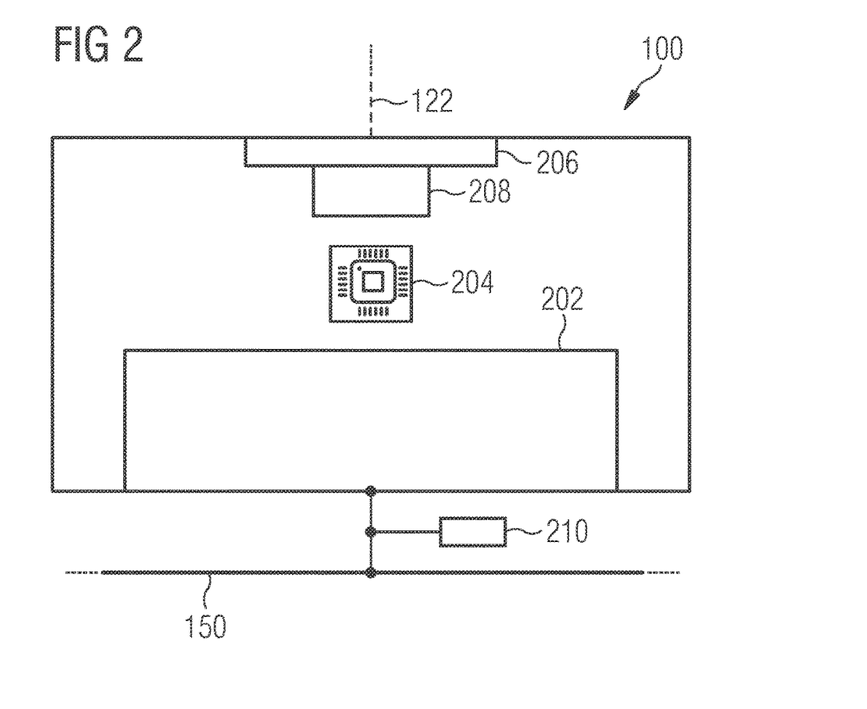
FIG. 2 depicts an energy supply device according to one exemplary embodiment of the present invention.

FIG. 2 depicts a schematic representation of the structure of such an energy supply device 100 according to one exemplary embodiment of the present invention. The device 100 comprises (a) a supply means 202 for supplying electric power for the power grid 150. If the energy supply device 100 is an electrical energy store, then the supply means 202 is not only configured to supply electrical energy but also to draw electrical energy from the power grid 150 and to store it.

The operation of the supply means 202 is controlled by a (local) control unit 204, wherein at least a first operating mode and a second operating mode are possible. In the first operating mode, the control unit 204 receives coordinated control signals via an interface 206 from the superordinate control device 120 depicted in FIG. 1. The corresponding communication link is also indicated in FIG. 2 by the reference character 122. The coordinated control signals give the control unit 204 specifications which also consider the instantaneous and/or future operation of other energy supply devices 100 which are also connected to the power grid 150.

The energy supply device 100 furthermore has a communication monitoring unit 208 which is coupled to the interface 206 and the (local) control unit 204 and which is configured (i) to monitor whether external coordinated control signals are received by the interface 206. If this should not be the case for a predetermined period of time, and no external or coordinated control signal or no valid external or coordinated control signal was received by the interface 206 for a predetermined period of time, then the communication monitoring unit 208 transmits an operating mode control signal to the control unit 204. As a response to the reception of such an operating mode control signal, the control unit 204 controls the supply means 202 in such a way that it transitions from the normal first operating mode to the second operating mode.

Since no coordinated external control signals can be received in this second operating mode due to a non-functioning communication link 122, the energy supply device 100 is dependent on autonomously determining the manner in which it works. This relates in particular to the magnitude of the instantaneous production or emission of electric power or, if the energy supply device 100 is an electrical energy store, possibly also the magnitude of the instantaneous electric power which is drawn from the power grid 150. In addition, in the second operating mode, the control unit 204 of the energy supply device 100 also decides whether it activates or deactivates itself. In the case of deactivation, it still checks whether other energy supply devices are still active.

In order to find suitable operating parameters in this second operating mode, according to the exemplary embodiment depicted here, a power grid monitoring unit 210 is associated with the energy supply device 100. Said monitoring unit locally measures electrical parameters of the power grid 150, at a measuring point of the power grid 150, said measurement point being near the energy supply device 100 at least in relation to the topology of the power grid 150. These parameters include in particular the instantaneous voltage and/or the instantaneous frequency of the supply voltage which is present at the power grid 150. In addition, the power supplied by the energy supply device 100 (reactive power and real power) are measured. The corresponding measured values are then passed to the control unit 204, which controls the operation of the energy supply device 100 or the supply means 202, as a function of these measured values. Based on the association of the power grid monitoring unit 210 with the energy supply device 100, these measured values may be referred to as internal measured values, so that the second operating mode of the energy supply device 100 is indeed an autonomous operating mode.

The operation of the energy supply device 100 in the second operating mode will be described in greater detail below based on several exemplary embodiments. Specifically, various types of energy supply devices 100 will be discussed.

According to the exemplary embodiment depicted here, it is true, regardless of the type of energy supply device 100, that in the second operating mode, which, due to a failure of the corresponding communication link, may also be referred to as the emergency operating mode, only a primary regulation and a tertiary regulation are carried out. A secondary regulation, which in particular keeps the frequency and the voltage of the supplied electric power at their setpoint value in the case of an alternating load, is explicitly not provided here. The primary regulation takes place in the exemplary embodiments described here via a droop function implemented in the respective local control unit 204. The tertiary regulation takes place via a (digital) activation/deactivation control which is also implemented in the respective local control unit 204.

I. Primary Regulations

I.1 Primary Regulation in Power Generators

In this section, the term "power generators" may be understood to mean all types of generators which convert mechanical energy into electrical energy, wherein the mechanical energy may take place from a conversion from thermal and/or chemical energy. In the case of the power grids described in this application, the power generators may, for example, be diesel generators or the generators of a (micro-)CHP plant.

All power generators which are connected to the power grid 150 and which are affected by a failure of the communication link jointly create a network having a defined frequency and a defined voltage amplitude. The setpoint values for the frequency ($f_{setpoint}$) and amplitude ($V_{setpoint}$) of the electric power supplied by the power generator are determined here according to the exemplary embodiment depicted here according to the following equations:

$$f_{setpoint} = k_f(P_{setpoint} - P_{actual}) + f_0 \quad (1)$$

$$V_{setpoint} = k_V(Q_{setpoint} - Q_{actual}) + V_0 \quad (2)$$

Here, $f_0$ and $V_0$ are the setpoint values for the frequency or the voltage of the power grid 150. $k_f$ and $k_V$ are the corresponding droop factors or proportionality constants. They are, in a known manner, indicative for how strongly the primary regulation reacts to changes in the actual values of the real electric power $P_{actual}$ or reactive power $Q_{actual}$ generated by the power generator. $P_{setpoint}$ is the setpoint real power; $Q_{setpoint}$ is the setpoint reactive power.

In the second operating mode, the parameters $k_f$, $P_{setpoint}$, $f_0$ and $k_V$, $Q_{setpoint}$, and $V_0$ are set to default values. These default values are matched to one another in such a way that a uniform load distribution takes place between the various power generators connected to the power grid 150.

It should be noted that the (mathematical) signs of the actual and reactive power relate to the so-called generator reference arrow system. Accordingly, positive real power corresponds to supplying power to the power grid.

I.2 Primary Regulation in Electrical Energy Stores

The electrical energy stores also create a network having a defined frequency and a defined voltage amplitude. In the second operating mode, an electrical energy store is also operated having the droop curves (1) and (2) specified above. However, since a battery cannot be endlessly discharged or charged, it has an additional autonomous discharging and charging control at least in the second operating mode. When charging the battery, if a defined upper state of charge (SOC) is approached, the local control unit raises the value $f_{setpoint}$ and/or $P_{setpoint}$ and thus reduces the power inflow. When discharging the battery, if the defined lower SOC is approached, the value for $f_{setpoint}$ and/or $P_{setpoint}$ is lowered, and thus the power outflow is reduced. In this case, the values for $f_{setpoint}$ and/or $P_{setpoint}$ which are kept non-constant may be set in such a way that the battery fluctuates in a range from 40%<SOC<70%. This process takes place very slowly, having a time constant in the range of several minutes. Thus, the battery responds to load jumps dynamically and participates in the dynamic stabilization of the power grid 150 without being discharged or charged too strongly. This also contributes to a lengthening of the service life of the electrical energy store (battery, accumulator).

I.3 Primary Regulation in Photovoltaic Systems and Wind Turbine Systems

The photovoltaic systems and wind turbine systems constitute power sources and require an available network. The following equations (3) and (4) specify the actual power $P_{setpoint}$ and the reactive power $Q_{setpoint}$ which are to be supplied by the corresponding system to the power grid.

$$P_{setpoint} = (f_{setpoint} - f_{actual})/k_f + P_0 \quad (3)$$

$$Q_{setpoint} = (V_{setpoint} - V_{actual})/k_V + Q_0 \quad (4)$$

Here, $f_{setpoint}$ and $V_{setpoint}$ are the setpoint values for the frequency and the voltage of the electric power supplied by the photovoltaic or wind turbine system. The parameters $f_{actual}$ or $V_{actual}$ are the associated actual values. $k_f$ and $k_V$ are the corresponding droop factors. $P_0$ and $Q_0$ are the setpoint values for the inflow of actual power or reactive power into the power grid.

In the second operating mode, the values for the parameters of the aforementioned equations (3) and (4) are set to suitable default values. In the case of appropriate matching of all droop factors, the hybrid energy supply system works in a stable manner, and the energy generation components distribute the overall load of the electrical loads connected to the power grid among each other. Depending on the load, the frequency and the amplitude of the voltage of the power grid fluctuate. In particular the deviation of the frequency from the rated frequency of the network can be used as a criterion for whether a high or a low load is present.

II. Tertiary Regulations

II.1 Tertiary Regulation in Power Generators

A low frequency of the power grid points to a high (overall) load due to the electrical loads. Therefore, in the case of the exemplary embodiment described here, falling below a lower frequency threshold is interpreted by the inactive power generators as an activation signal. So that not all power generators switch on simultaneously, in the case of the exemplary embodiment described here, each generator has an individual delay for its activation signal. If there is no voltage at the power grid (for example, because all generators were deactivated, a so-called "blackout"), then, for safety reasons (in the second operating mode), a renewed activation of generators is prevented. If the power of an active generator falls below a predetermined lower threshold, then the relevant generator independently switches itself off. As a result, it is prevented (in the second operating mode) that a plurality of generators work with too little power for reasons of efficiency. A possibly very unfavorable simultaneous deactivation of several or even all generators connected to the power grid for reasons of stability is prevented according to the exemplary embodiment depicted here in that each generator has an individual delay of its deactivation signal. Alternatively, the lowering of the frequency of the power grid below a predetermined lower threshold value may be used as a deactivation signal, possibly individually delayed for each generator.

In order to implement a smooth deactivation (for reasons of stability), before the actual deactivation, the relevant generator may unload itself, in that it decreases the frequency and the amplitude of the voltage supplied by it until the actual and reactive power fall below a predetermined threshold value. If this is possible, then other energy supply devices ostensibly assume the load of the generator. If this is not possible, then the relevant generator is the last remaining energy supply device and therefore does not switch off because a complete failure of the power grid (blackout) would otherwise have to be attended to.

II.2 Tertiary Regulation with Electrical Energy Stores

In the exemplary embodiment described here, the electrical energy stores are generally always activated in the second operating mode, if possible, for example, for reasons of operating safety. They never deactivate themselves independently. In this sense, there is a limited tertiary regulation for electrical energy stores which prevents deactivation of the electrical energy stores. Independent activation of inactive electrical energy stores in the second operating mode may be possible.

II.3 Tertiary Regulation in Photovoltaic Systems and Wind Turbine Systems

In the second operating mode, the photovoltaic and wind turbine systems are always activated if the electrical energy store(s) is/are activated. If all energy stores are not activated or if the state of the energy stores cannot be reliably determined, the photovoltaic and wind turbine systems deactivate themselves. Alternatively, in this case, they could also be operated at a highly reduced feed-in power (for example, their minimal power in a 24-hour power curve).

LIST OF REFERENCE CHARACTERS

100 Energy supply device
100a Photovoltaic system
100b Wind turbine system
100c Electrical energy store
100d Power generator
100e Combined heat and power plant
110 Energy supply system
120 Superordinate control device/control system
122 Communication link
150 Power grid
170 Electrical load
170a Household
170b Factory
202 Supply means
204 Control unit
206 Interface
208 Communication monitoring unit
210 Power grid monitoring unit

The invention claimed is:

1. An energy supply device, comprising:
an electrical supply connected to a power grid;
a controller for controlling an operation of said electrical supply in a first operating mode and in a second operating mode;
an interface configured for receiving external control signals and for routing the external control signals which are indicative of a manner in which said electrical supply works in the first operating mode; and
a communication monitor coupled to said interface and said controller, said communication monitor is configured:
(i) to monitor whether the external control signals are received by said interface; and
(ii) if, for a predetermined period of time, no external control signal or no valid external control signal was received by said interface, to transmit an operating mode control signal to said controller which induces said controller to operate said electrical supply in the second operating mode;
(iii) if, for a further predetermined period of time, valid external control signals are received, performing the further steps of:
receiving a diagnosis start signal by means of the controller;
transitioning the enemy supply device from the first operating mode to the second operating mode;
collecting diagnosis information which is indicative of operating parameter values of the enemy supply device in the second operating mode; and
transmitting the diagnosis information to a superordinate controller.

2. The energy supply device according to claim 1, wherein the energy supply device is selected from the group consisting of;
a power generator;
a combined heat and power plant having a power generation turbine;
a photovoltaic system;
a wind turbine system; and
an electrical energy store.

3. The energy supply device according to claim 2, wherein:
said power generator is a diesel generator; and
said combined heat and power plant is a micro-combined heat and power plant.

4. The energy supply device according to claim 1, wherein the second operating mode is an autonomous operating mode.

5. The energy supply device according to claim 1, further comprising a power grid monitor which is coupled to said controller and which can be coupled to the power grid at a measurement point.

6. The energy supply device according to claim 1, wherein in the second operating mode, only a primary regulation and/or tertiary regulation takes place.

7. An energy supply system, comprising:
at least two energy supply devices each having:
an electrical supply connected to a power grid;
a controller for controlling an operation of said electrical supply in a first operating mode and in a second operating mode;
an interface configured for receiving external control signals and for routing the external control signals which are indicative of a manner in which said electrical supply works in the first operating mode; and
a communication monitor coupled to said interface and said controller, said communication monitor is configured:
(i) to monitor whether the external control signals are received by said interface; and
(ii) if, for a predetermined period of time, no external control signal or no valid external control signal was received by said interface, to transmit an operating mode control signal to said controller which induces said controller to operate said electrical supply in the second operating mode;

(iii) if, for a further predetermined period of time, valid external control signals are received, performing the further steps of:
receiving a diagnosis start signal by means of a controller;
transitioning the energy supply device from the first operating mode to the second operating mode;
collecting diagnosis information which is indicative of operating parameter values of the enemy supply device in the second operating mode; and
transmitting the diagnosis information to a superordinate controller;
a communication link; and
a superordinate controller, coupled communicatively to said energy supply devices via said communication link, so that, if said communication link is intact, the external control signals from said superordinate controller are transmittable to a respective said controller of said energy supply devices.

8. A method for supplying electric power to a power grid or for electrical loads connected to the power grid by means of an energy supply device, which comprises the steps of:
monitoring whether external control signals are received by an interface of the energy supply device; and
transitioning the energy supply device from a first operating mode to a second operating mode if, for a predetermined period of time, no external control signal or no valid external control signal was received by the interface and routed to a controller of the energy supply device;
if, for a further predetermined period of time, valid external control signals are received, performing the further steps of:
receiving a diagnosis start signal by means of a controller;
transitioning the enemy supply device from the first operating mode to the second operating mode;
collecting diagnosis information which is indicative of operating parameter values of the enemy supply device in the second operating mode; and
transmitting the diagnosis information to a superordinate controller.

9. The method according to claim 8, wherein the controller of the energy supply device controls an electrical supply of the energy supply device in the second operating mode in such a way that the electrical supply supplies the electric power to the power grid which has a predetermined ratio in relation to further electric power which is supplied to the power grid by another electrical supply of another energy supply device.

10. The method according to claim 8, which further comprises transitioning the energy supply device from the second operating mode to the first operating mode if, after a certain time, valid external control signals are again received.

11. The method according to claim 10, wherein a transition from the second operating mode to the first operating mode takes place only after a predetermined delay time after a renewed reception of the valid external control signals.

12. The method according to claim 10, which further comprises
before transitioning the energy supply device from the second operating mode to the first operating mode, parameterizing the energy supply device with parameter values which, in a case of a transition from the second operating mode to the first operating mode, are indicative of a manner of operation in the first operating mode.

13. A non-transitory computer media having computer executable programming for supplying electric power to a power grid or for electrical loads connected to the power grid, by means of an energy supply device, wherein the computer executable program, if it is executed by a processor, is configured for carrying out a method having the following method steps:
monitoring whether external control signals are received by an interface of the energy supply device; and
transitioning the energy supply device from a first operating mode to a second operating mode if, for a predetermined period of time, no external control signal or no valid external control signal was received by the interface and routed to a controller of the energy supply device;
if, for a further predetermined period of time, valid external control signals are received, performing the further steps of:
receiving a diagnosis start signal by means of a controller;
transitioning the enemy supply device from the first operating mode to the second operating mode;
collecting diagnosis information which is indicative of operating parameter values of the enemy supply device in the second operating mode; and
transmitting the diagnosis information to a superordinate controller.

* * * * *